(12) United States Patent
Shimoda et al.

(10) Patent No.: US 8,484,910 B2
(45) Date of Patent: Jul. 16, 2013

(54) ACTIVE DYNAMIC VIBRATION ABSORBER

(75) Inventors: Ikuo Shimoda, Tokyo (JP); Mitsuru Miyazaki, Tokyo (JP); Yuichi Iwasaki, Tochigi (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 13/513,683

(22) PCT Filed: Nov. 12, 2010

(86) PCT No.: PCT/JP2010/006655
§ 371 (c)(1),
(2), (4) Date: Jul. 10, 2012

(87) PCT Pub. No.: WO2011/074179
PCT Pub. Date: Jun. 23, 2011

(65) Prior Publication Data
US 2012/0266547 A1 Oct. 25, 2012

(30) Foreign Application Priority Data
Dec. 18, 2009 (JP) .................................. 2009-288520

(51) Int. Cl.
*F16F 15/00* (2006.01)
(52) U.S. Cl.
USPC ....... 52/167.2; 52/167.7; 52/167.8; 52/167.9; 248/562; 248/636
(58) Field of Classification Search
USPC ............ 52/167.1, 167.2, 167.4, 167.7–167.9; 248/562, 636
See application file for complete search history.

(56) References Cited

U.S. PATENT DOCUMENTS 4,401,342 A * 8/1983 Andersson ............... 297/216.16
4,763,869 A * 8/1988 Nakamura et al. ............ 248/562
(Continued)

FOREIGN PATENT DOCUMENTS

JP 64-29585 1/1989
JP 2966146 8/1999
(Continued)

OTHER PUBLICATIONS

International Search Report for PCT/JP2010/006655 mailed Dec. 7, 2010.

*Primary Examiner* — William Gilbert
*Assistant Examiner* — Alp Akbasli
(74) *Attorney, Agent, or Firm* — Nixon & Vanderhye, PC

(57) ABSTRACT

An active dynamic vibration absorber 1 includes a weight 2; a frame 3 which is adjacent to the weight 2 in such a manner as to surround the weight 2 with clearances X1 and Y1; a holding mechanism 4 which is interposed between the weight 2 and the frame 3 and holds the weight 2 movably in an X direction with respect to the frame 3, while holding the weight 2 immovably in a Y direction and a vertical direction V; a detecting means 5 for detecting the relative vibration of a predetermined value in the X direction of the weight 2 with respect to the frame 3; and a moving means 6 for relatively moving the weight 2 in the X direction with respect to the frame 3 on the basis of a detection signal from the detecting means 5 such that the relative movement of the weight 2 in the X direction with respect to the frame 3 is allowed, while the vibrational displacement of the weight 2 in the X direction with respect to the frame 3 is reduced.

13 Claims, 3 Drawing Sheets

U.S. PATENT DOCUMENTS

| | | | |
|---|---|---|---|
| 5,025,600 A * | 6/1991 | Sugimoto et al. | 52/167.1 |
| 5,067,549 A * | 11/1991 | Musschoot | 164/39 |
| 6,457,510 B1 * | 10/2002 | van Heerveld | 164/39 |
| 6,862,849 B2 * | 3/2005 | Kim | 52/167.9 |
| 8,307,586 B2 * | 11/2012 | Tsai | 52/167.9 |
| 2008/0258032 A1 * | 10/2008 | Bullivant | 248/562 |

FOREIGN PATENT DOCUMENTS

| | | |
|---|---|---|
| JP | 2004-144178 | 5/2004 |
| JP | 2005-163915 | 6/2005 |
| JP | 2009-138775 | 6/2009 |

\* cited by examiner

ACTIVE DYNAMIC VIBRATION ABSORBER

This application is the U.S. national phase of International Application No. PCT/JP2010/006655 filed 12 Nov. 2010 which designated the U.S. and claims priority to JP 2009-288520 filed 18 Dec. 2009, the entire contents of each of which are hereby incorporated by reference.

TECHNICAL FIELD

The present invention relates to an active dynamic vibration absorber (active mass damper) for reducing vibrations caused in a structure due to a strong wind, an earthquake, and the like.

BACKGROUND ART

As an active dynamic vibration absorber, one disclosed in Patent Document 1 is known, and this active dynamic vibration absorber is so constructed that a pair of electromagnets each having a pair of poles spaced apart with an interval therebetween are alternately energized to generate a reaction force, thereby reducing vibration in one direction within a horizontal plate.

PRIOR ART DOCUMENTS

Patent Documents

Patent Document 1: Japanese Patent No. 2966146
Patent Document 2: JP-A-2004-144178

SUMMARY OF THE INVENTION

Problems that the Invention is to Solve

Incidentally, since the reaction force based on an electromagnet is inversely proportional to the square of the distance, in order to obtain a large reaction force by the electromagnet, it is necessary to either narrow the interval between the pair of poles or increase the electric current which is applied to the electromagnet. However, if the interval between the pair of poles is made narrow, the dynamic range of the active dynamic vibration absorber becomes narrow, so that the active dynamic vibration absorber may possibly fail to operate with respect to vibration of a large amplitude. Meanwhile, if the electric current which is applied to the electromagnet is increased, a current source of a large capacity is required, and it is necessary to use an electric circuit capable of processing a large current, possibly incurring higher cost.

Accordingly, an active dynamic vibration absorber such as the one disclosed in Patent Document 2 has been proposed which has a wire which is wound at one end around an output rotating shaft of an electric motor secured to a weight and is secured at the other end to a frame. With the proposed active dynamic vibration absorber, it is possible to duly obtain a desired dynamic range and attain a high performance and a cost reduction. However, the amount of pulling of the wire and the amount of movement of the weight are one to one, and in a case where a weight of a large mass is moved, an electric motor having a large output torque is required, with the result that even such an active dynamic vibration absorber may possibly incur higher cost.

The present invention has been devised in view of the above-described aspects, and its object is to provide an active dynamic vibration absorber which makes it possible to obtain a desired dynamic range and attain a higher performance and a further cost reduction.

Means for Solving the Problems

An active dynamic vibration absorber in accordance with the present invention comprises: a weight; a frame arranged adjacent to the weight; a holding mechanism which is interposed between the weight and the frame and holds the weight movably in one direction in a horizontal plane with respect to the frame, while holding the weight immovably in another direction in the horizontal plane intersecting the one direction and in a vertical direction perpendicular to the horizontal plane; detecting means for detecting the relative vibration of a predetermined value in the one direction of the weight with respect to the frame; and moving means for relatively moving the weight in the one direction with respect to the frame so as to decrease the vibrational displacement in the one direction of the weight with respect to the frame on the basis of a detection signal from the detecting means, wherein the frame has a pair of vertical wall portions which are opposed to each other in the one direction with the weight located therebetween, and the moving means includes a first rotatable body which is rotatably mounted on one of the pair of vertical wall portions; a second rotatable body which is rotatably mounted on another one of the pair of vertical wall portions; a first flexible body which is connected at one end portion to the weight and is wound around the first rotatable body; a second flexible body which is connected at one end portion to the weight and is wound around the second rotatable body; and a flexible body pulling means which is provided on the weight and is connected to other end portions of the first and the second flexible body, such that, in its operation in the one direction, the flexible body pulling means pulls the first flexible body and causes the weight to pull the second flexible body due to the pulling of the first flexible body, while, in its operation in another direction which is a direction opposite to the one direction, the flexible body pulling means pulls the second flexible body and causes the weight to pull the first flexible body due to the pulling of the second flexible body.

According to this active dynamic vibration absorber, the moving means includes the first flexible body which is connected at one end portion to the weight and is wound around the first rotatable body; the second flexible body which is connected at one end portion to the weight and is wound around the second rotatable body; and the flexible body pulling means which is provided on the weight and is connected to other end portions of the first and the second flexible body, such that, in its operation in the one direction, the flexible body pulling means pulls the first flexible body and causes the weight to pull the second flexible body due to the pulling of the first flexible body, while, in its operation in another direction which is a direction opposite to the one direction, the flexible body pulling means pulls the second flexible body and causes the weight to pull the first flexible body due to the pulling of the second flexible body. Therefore, the first and the second rotatable body can be operated like movable blocks, with the result that the tractive force for the first and the second flexible body can be made small, so that in the case where the flexible body pulling means is implemented by, for instance, a reversible electric motor, it is possible to use a reversible electric motor having a small torque, thereby making it possible to obtain a desired dynamic range and attain a higher performance and a further cost reduction.

In the active dynamic vibration absorber in accordance with the present invention, the flexible body pulling means may include a reversible electric motor fixed to the weight and a rotating body which is connected to an output rotating shaft of the reversible electric motor so as to rotate together with the output rotating shaft. In this instance, the first flexible body may be connected at its other end portion to the rotating body such that as the rotating body is rotated in the one direction by the operation of the reversible electric motor in the one direction, the first flexible body is pulled by being taken up onto the rotating body, whereas as the rotating body is rotated in the other direction by the operation of the reversible electric motor in the other direction, the first flexible body is paid out from the rotating body to allow the pulling by the weight, and the second flexible body may be connected at its other end portion to the rotating body such that as the rotating body is rotated in the one direction by the operation of the reversible electric motor in the one direction, the second flexible body is paid out from the rotating body to allow the pulling by the weight, whereas as the rotating body is rotated in the other direction by the operation of the reversible electric motor in the other direction, the second flexible body is pulled by being taken up onto the rotating body.

Alternatively, the flexible body pulling means may include a reversible electric motor fixed to the weight, a pinion which is connected to an output rotating shaft of the reversible electric motor so as to rotate together with the output rotating shaft, and a traveling body constituted by a rack which is disposed in such a manner as to mesh with the pinion and extend in the one direction. In this instance, the first flexible body may be connected at its other end portion to one end portion of the traveling body such that as the traveling body is linearly moved in the one direction by the operation of the reversible electric motor in the one direction, the first flexible body is pulled by being drawn by the traveling body, whereas as the traveling body is linearly moved in the other direction by the operation of the reversible electric motor in the other direction, the first flexible body allows the pulling by the weight, and the second flexible body may be connected at its other end portion to another end portion of the traveling body such that as the traveling body is linearly moved in the one direction by the operation of the reversible electric motor in the one direction, the second flexible body allows the pulling by the weight, whereas as the traveling body is linearly moved in the other direction by the operation of the reversible electric motor in the other direction, the second flexible body is pulled by being drawn by the traveling body.

Still alternatively, the flexible body pulling means may include a linear motor which has a stator fixed to the weight and a movable element which is movable in the one direction with respect to the stator. In this instance, the first flexible body may be connected at its other end portion to one end portion of the movable element such that as the movable element is linearly moved in the one direction by the operation of the linear motor in the one direction, the first flexible body is pulled by being drawn by the movable element, whereas as the movable element is linearly moved in the other direction by the operation of the linear motor in the other direction, the first flexible body allows the pulling by the weight, and the second flexible body may be connected at its other end portion to another end portion of the movable element such that as the movable element is linearly moved in the one direction by the operation of the linear motor in the one direction, the second flexible body allows the pulling by the weight, whereas as the movable element is linearly moved in the other direction by the operation of the linear motor in the other direction, the second flexible body is pulled by being drawn by the movable element.

Furthermore, the flexible body pulling means may include a reversible electric motor fixed to the weight, a ball nut which is connected to an output rotating shaft of the reversible electric motor so as to rotate together with the output rotating shaft, and a traveling body constituted by a ball screw which is disposed in such a manner as to screw with the ball nut and extend in the one direction. In this instance, the first flexible body may be connected at its other end portion to one end portion of the traveling body such that as the traveling body is linearly moved in the one direction by the operation of the reversible electric motor in the one direction, the first flexible body is pulled by being drawn by the traveling body, whereas as the traveling body is linearly moved in the other direction by the operation of the reversible electric motor in the other direction, the first flexible body allows the pulling by the weight, and the second flexible body may be connected at its other end portion to another end portion of the traveling body such that as the traveling body is linearly moved in the one direction by the operation of the reversible electric motor in the one direction, the second flexible body allows the pulling by the weight, whereas as the traveling body is linearly moved in the other direction by the operation of the reversible electric motor in the other direction, the second flexible body is pulled by being drawn by the traveling body.

In a preferred example of the present invention, the frame has another pair of vertical wall portions which are opposed to each other in the other direction with the weight located therebetween, and the holding mechanism includes a pair of vertically mounted U-shaped leaf springs which are each interposed between the weight and each of the other pair of vertical wall portions so as to allow the movement of the weight in the one direction with respect to the frame and to hold the weight immovably in the vertical direction with respect to the frame, and a pair of horizontally mounted U-shaped leaf springs which are each interposed between each of the pair of vertical wall portions and the weight so as to allow the movement of the weight in the one direction with respect to the frame and to prevent the movement of the weight in the other direction with respect to the frame.

If the holding mechanism is constituted by the U-shaped leaf springs, the weight and the frame can be held movably in the one direction without frictional resistance, with the result that an active dynamic vibration absorbing function can be obtained in a substantially ideal form.

Preferably, each of the first and the second flexible body is a cord-like body including such as a wire, a belt, and a chain, but may be another flexible body In the present invention, the reversible electric motor or the linear motor may be adapted to allow the free rotation of the output rotating shaft or the linear movement of the movable element and to pull the first or the second flexible body through the output rotating shaft or the movable element on the basis of a detection signal of the detecting means, so as to relatively move the weight in the one direction with respect to the pair of vertical wall portions of the frame.

The detecting means may be adapted to detect the relative vibration of a predetermined value in the one direction of the weight with respect to the frame, may be adapted to detect at least one of the acceleration, velocity, and displacement of the relative vibration, or may be adapted to detect the relative vibration of a fixed value or higher in the one direction of the weight with respect to the frame.

In the present invention, the one direction and the other direction suffice if they intersect each other, but are preferably perpendicular to each other.

The active dynamic vibration absorber in accordance with the present invention is adapted to effect the reduction of vibration in one direction within a horizontal plane. In such an active dynamic vibration absorber, an arrangement may be so provided that, by providing a similar construction to the construction for effecting the reduction of vibration in one direction within the horizontal plane, the reduction of vibration in one direction within the horizontal plane is effected, and the reduction of vibration in another direction within the horizontal plane is also effected. In this instance, the weight and the detecting means in the construction for effecting the reduction of vibration in one direction within the horizontal plane may be used commonly for the construction for effecting the reduction of vibration in the other direction within the horizontal plane. In substitution of this, a construction for effecting the reduction of vibration in the other direction within the horizontal plane may be added separately from the construction for effecting the reduction of vibration in one direction within the horizontal plane.

Advantages of the Invention

According to the present invention, it is possible to provide an active dynamic vibration absorber which makes it possible to obtain a desired dynamic range and attain a higher performance and a further cost reduction.

MODE FOR CARRYING OUT THE INVENTION

Figure 1:
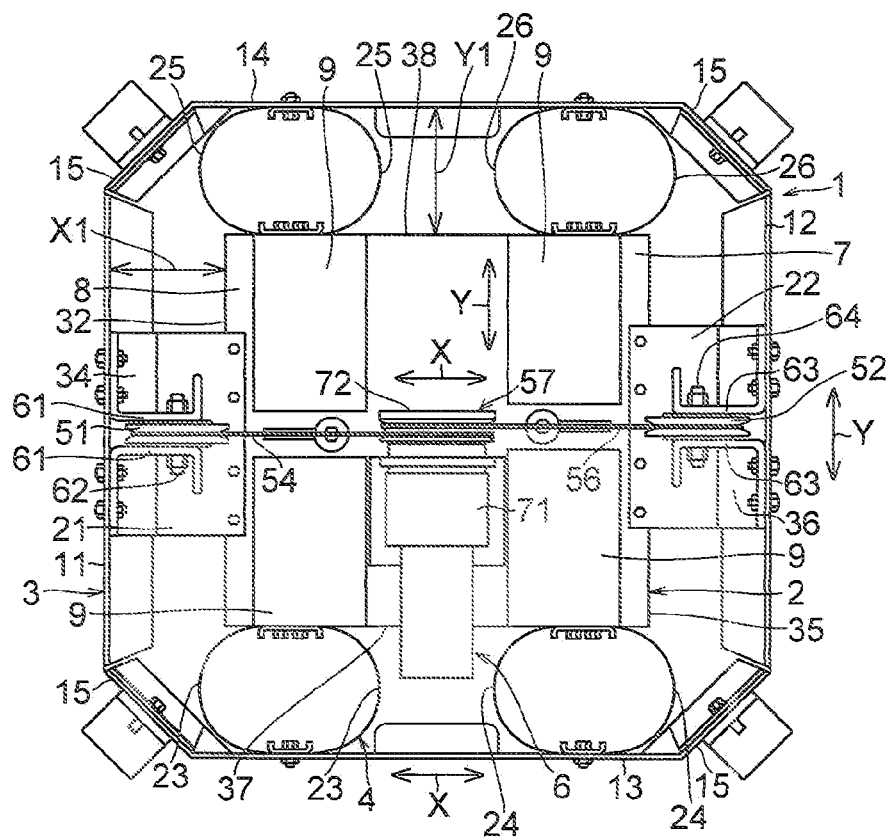
FIG. 1 is a plan view of a preferred embodiment of the present invention.
Figure 2:
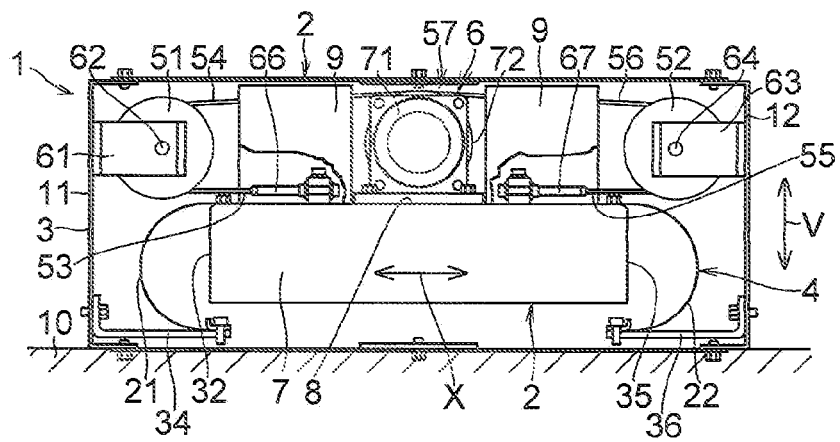
FIG. 2 is an explanatory side cross-sectional view of the embodiment shown in FIG. 1.
Figure 3:
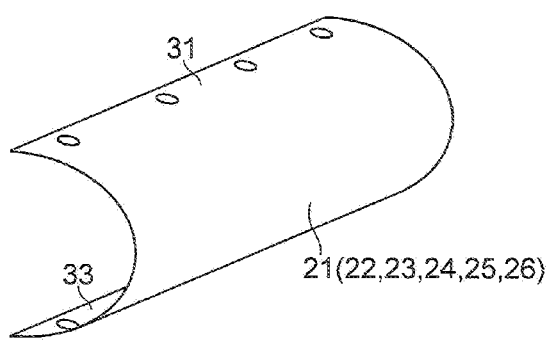
FIG. 3 is a perspective view of a leaf spring used in the embodiment shown in FIG. 1.
Figure 4:
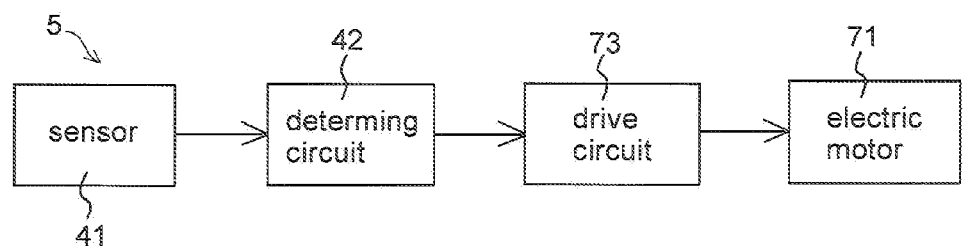
FIG. 4 is a block diagram of an electric circuit of the embodiment shown in FIG. 1.

Hereafter, a more detailed description will be given of the present invention and examples in which its embodiments are applied to structures with reference to the figures. It should be noted that the present invention is not limited to these embodiments.

Embodiment

In FIGS. 1 to 4, an active dynamic vibration absorber 1 is comprised of a weight 2; a frame 3 which is arranged in a substantially square shape in a plan view and is adjacent to the weight 2 in such a manner as to surround the weight 2 with a clearance X1 in an X direction which is one direction in a horizontal plane and with a clearance Y1 in a Y direction which is another direction in the horizontal direction intersecting the X direction, i.e., perpendicular to the X direction in this embodiment; a holding mechanism 4 which is interposed between the weight 2 and the frame 3 and holds the weight 2 movably in the X direction with respect to the frame 3, while holding it immovably in the Y direction and a vertical direction V perpendicular to the horizontal plane; a detecting means 5 for detecting the relative vibration of a predetermined value in the X direction of the weight 2 with respect to the frame 3; and a moving means 6 for relatively moving the weight 2 in the X direction with respect to the frame 3 on the basis of a detection signal from the detecting means 5 such that the relative movement of the weight 2 in the X direction with respect to the frame 3 is allowed, while the vibrational displacement of the weight 2 in the X direction with respect to the frame 3 is reduced.

The weight 2 includes a main weight body 7 and four segmentary weight bodies 9 secured to an upper surface 8 of the main weight body 7.

The frame 3, which is fixed at its lower ends to a floor portion 10 of a roof floor or the like of a structure, has a pair of vertical wall portions 11 and 12 which are opposed to each other in the X direction with the main weight body 7 located therebetween and with the clearance X1 with respect to the main weight body 7, a pair of vertical wall portions 13 and 14 which are opposed to each other in the Y direction with the main weight body 7 located therebetween and with the clearance Y1 with respect to the main weight body 7, and four corner wall portions 15 which are connected to respective ones of the vertical wall portions 11 and 12 and the vertical wall portions 13 and 14 by means of welding, screws, nuts, or the like. The pair of vertical wall portions 11 and 12 and the pair of vertical wall portions 13 and 14 are integrally connected to each other by means of the corner wall portions 15 so as to form the substantially square frame 3.

The holding mechanism 4 includes a pair of horizontally mounted U-shaped leaf springs 21 and 22 which are each interposed between each of the pair of vertical wall portions 11 and 12 and the main weight body 7 such that the movement of the weight 2 in the X direction with respect to the frame 3 is allowed, while the movement of the weight 2 in the Y direction with respect to the frame 3 is prevented, and two pairs of vertically mounted U-shaped leaf springs 23 and 24, and 25 and 26, which are each interposed between the main weight body 7 and each of the pair of vertical wall portions 13 and 14 such that the movement of the weight 2 in the X direction with respect to the frame 3 is allowed, while the weight 2 is held immovably in the vertical direction V with respect to the frame 3.

The leaf spring 21 is secured at its one edge portion 31 to the upper surface 8 of the main weight body 7 on a side surface 32 side and at its other edge portion 33 to a central lower portion of the vertical wall portion 11 by means of fittings 34, respectively, and the leaf spring 22 is secured at its one edge portion 31 to the upper surface 8 of the main weight body 7 on a side surface 35 side and at its other edge portion 33 to a central lower portion of the vertical wall portion 12 by means of fittings 36, respectively. Each of the pair of leaf springs 23 disposed such that their concave surfaces are opposed to each other is secured at its one edge portion 31 to a side surface 37 of the main weight body 7 and at its other edge portion 33 to the vertical wall portion 13, respectively, and each of the pair of leaf springs 24, which are similarly disposed such that their concave surfaces are opposed to each other and disposed in such a manner as to be spaced apart from the pair of leaf springs 23 in the X direction, is secured at its one edge portion 31 to the side surface 37 of the main weight body 7 and at its other edge portion 33 to the vertical wall portion 13, respectively. Each of the pair of leaf springs 25 disposed such that their concave surfaces are opposed to each other is secured at its one edge portion 31 to a side surface 38 of the main weight body 7 and at its other edge portion 33 to the vertical wall portion 14, respectively, and each of the pair of leaf springs 26, which are similarly disposed such that their concave surfaces are opposed to each other and disposed in such a manner as to be spaced apart from the pair of leaf springs 25 in the X direction, is secured at its one edge portion 31 to the side surface 38 of the main weight body 7 and at its other edge portion 33 to the vertical wall portion 14, respectively.

The detecting means 5, which is adapted to detect the relative vibration of a predetermined value in the X direction of the weight 2 with respect to the frame 3, includes a sensor 41 which electrically detects at least one of the acceleration, velocity, and displacement of the relative vibration, i.e., acceleration in this embodiment, as well as an X-direction displacement determining circuit 42 which electrically determines an X-direction displacement and a displacement direction by performing time integration of the acceleration in the X direction from among accelerations detected by the sensor 41, and when this X-direction displacement reaches a fixed value or higher, sends an operation signal for operating the moving means 6 and a displacement direction signal.

The sensor 41 is mounted between the floor portion 10 and the main weight body 7, and the detecting means 5 is adapted to detect the relative vibration of a fixed value or higher in the X direction of the frame 3 with respect to the weight 2 to thereby detect the relative vibration of the structure with respect to the weight 2.

The X-direction displacement determining circuit 42 determines from the detected acceleration from the sensor 41 whether the weight 2 has been relatively displaced to the vertical wall portion 11 side or to the vertical wall portion 12 side in the X direction, and if the weight 2 has been relatively displaced to the vertical wall portion 11 side in the X direction, the X-direction displacement determining circuit 42 is adapted to send a displacement direction signal indicative of relatively moving the weight 2 to the vertical wall portion 12 side in the X direction, whereas if the weight 2 has been relatively displaced to the vertical wall portion 12 side in the X direction, the X-direction displacement determining circuit 42 is adapted to send a displacement direction signal indicative of relatively moving the weight 2 to the vertical wall portion 11 side in the X direction.

The moving means 6, which is adapted to relatively move the weight 2 in the X direction with respect to the pair of vertical wall portions 11 and 12 of the frame 3, includes a pulley 51 serving as a rotatable body which is rotatably mounted on the vertical wall portion 11; a pulley 52 serving as a rotatable body which is rotatably mounted on the vertical wall portion 12; a wire, a belt, or a chain, i.e., in this embodiment a wire 54, serving as a flexible body which is connected at one end portion 53 to the main weight body 7 and is wound around the pulley 51; a wire, a belt, or a chain, i.e., in this embodiment a wire 56, serving as a flexible body which is connected at one end portion 55 to the main weight body 7 and is wound around the pulley 52; and a flexible body pulling means 57 which is provided on the main weight body 7 and is connected to other end portions of the wires 54 and 56, such that, in its operation in one direction, the flexible body pulling means 57 pulls the wire 54 and causes the weight 2 to pull the wire 56 due to the pulling of the wire 54, while, in its operation in another direction which is a direction xopposite to the one direction, the flexible body pulling means 57 pulls the wire 56 and causes the weight 2 to pull the wire 54 due to the pulling of the wire 56.

The pulley 51 is rotatably mounted on the vertical wall portion 11 by means of a shaft 62 which is supported by a pair of cross-sectionally U-shaped support members 61 mounted on the vertical wall portion 11, and the pulley 52 is also rotatably mounted on the vertical wall portion 12 by means of a shaft 64 which is supported by a pair of cross-sectionally U-shaped support members 63 mounted on the vertical wall portion 12.

The wire 54 is connected at its one end portion 53 to the main weight body 7 by means of a connecting tool 66 mounted on the main weight body 7, and the wire 56 is also connected at its one end portion 55 to the main weight body 7 by means of a connecting tool 67 mounted on the main weight body 7.

The flexible body pulling means 57 includes a reversible electric motor 71 fixed to the upper surface 8 of the main weight body 7, a pulley 72 serving as a rotating body which is connected to an output rotating shaft of the reversible electric motor 71 so as to rotate together with that output rotating shaft, and a drive circuit 73 for supplying a drive current to the reversible electric motor 71 by a drive signal and a displacement direction signal from the X-direction displacement determining circuit 42.

In cases where the drive circuit 73 does not receive a drive signal from the X-direction displacement determining circuit 42 on the basis of a detection signal of the detecting means 5, and the reversible electric motor 71 does not receive the supply of a drive current from the drive circuit 73, i.e., in cases where there is no supply of the drive current from the drive circuit 73, the reversible electric motor 71 allows the free rotation of its output rotating shaft and, hence, the free rotation of the pulley 72. On the other hand, in cases where the drive circuit 73 receives a drive signal and a displacement direction signal from the X-direction displacement determining circuit 42 on the basis of a detection signal of the detecting means 5, and the reversible electric motor 71 receives the supply of a drive current from the drive circuit 73, i.e., in cases where there is a supply of the drive current from the drive circuit 73, the reversible electric motor 71 is adapted to rotate its output rotating shaft and, hence, the pulley 72 to thereby cause the wire 54 or 56 to be taken up onto the pulley 72 or to be paid out from the pulley 72 so as to relatively move the weight 2 in the X direction with respect to the pair of vertical wall portions 11 and 12 of the frame 3 by pulling the wire 54 or 56.

Upon receiving from the X-direction displacement determining circuit 42 a displacement direction signal indicative of the fact that the weight 2 has been relatively displaced to the vertical wall portion 11 side in the X direction simultaneously with a drive signal from the X-direction displacement determining circuit 42, the drive circuit 73 supplies to the reversible electric motor 71 a drive current indicative of relatively moving the weight 2 to the vertical wall portion 12 side in the X direction. Instead, upon receiving from the X-direction displacement determining circuit 42 a displacement direction signal indicative of the fact that the weight 2 has been relatively displaced to the vertical wall portion 12 side in the X direction simultaneously with a drive signal from the X-direction displacement determining circuit 42, the drive circuit 73 supplies to the reversible electric motor 71 a drive current indicative of relatively moving the weight 2 to the vertical wall portion 11 side in the X direction.

The wire 54 is connected at its other end portion to the pulley 72 such that as the pulley 72 is rotated in one direction, e.g., is rotated forwardly, by the operation of the reversible electric motor 71 in the one direction, the wire 54 is pulled by being taken up onto the pulley 72, whereas as the pulley 72 is rotated in the other direction, e.g., is rotated reversely, by the operation of the reversible electric motor 71 in the other direction, the wire 54 is paid out from the pulley 72 to be set in a non-pulling state and to allow the pulling by the weight 2.

The wire 56 is connected at its other end portion to the pulley 72 such that as the pulley 72 is rotated in one direction, e.g., is rotated forwardly, by the operation of the reversible electric motor 71 in the one direction, the wire 56 is paid out from the pulley 72 to be set in a non-pulling state and to allow the pulling by the weight 2, whereas as the pulley 72 is rotated in the other direction, e.g., is rotated reversely, by the operation of the reversible electric motor 71 in the other direction, the wire 56 is pulled by being taken up onto the pulley 72.

With the above-described active dynamic vibration absorber 1 in which the frame 3 is fixed to the floor portion 10 of the structure, when the structure does not vibrate in the X direction, the weight 2 is held movably in the X direction and immovably in the Y direction and the vertical direction V by the holding mechanism 4, and the pulley 72 in the moving means 6 is also adapted to be freely rotatable and not cause the wires 54 and 56 to pull, so as not to hamper the movability of the weight 2 in this X direction.

Figure 5:
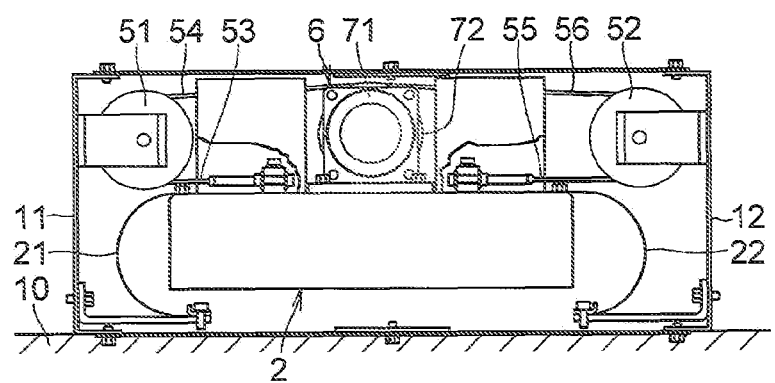
FIG. 5 is a diagram explaining the operation of the embodiment shown in FIG. 1.

Further, with the active dynamic vibration absorber 1, the arrangement provided is such that in the event that the floor portion 10 of the structure has vibrated greatly in the X direction due to an earthquake, a strong wind, or the like, and the weight 2 has relatively approached the vertical wall portion 11 by more than a fixed extent, as shown in FIG. 5, a drive current is supplied to the reversible electric motor 71 to reversely rotate the pulley 72 so that the wire 56 is pulled by the pulley 72 and the wire 54 is paid out from the pulley 72, while the weight 2 is caused to pull the wire 54 due to the pulling of the wire 56 so as to move the weight 2 from the vertical wall portion 11, whereby a reaction force is imparted to the vibration in the X direction of the floor portion 10 of the structure which causes the weight 2 to relatively approach the vertical wall portion 11, thereby reducing the vibration in the X direction of the floor portion 10 of the structure. Meanwhile, in the event that the weight 2 has relatively approached the vertical wall portion 12 by more than a fixed extent due to an earthquake, a strong wind, or the like, a drive current is supplied to the reversible electric motor 71 to forwardly rotate the pulley 72 so that the wire 54 is pulled by the pulley 72 and the wire 56 is paid out from the pulley 72, while the weight 2 is caused to pull the wire 56 due to the pulling of the wire 54 so as to move the weight 2 from the vertical wall portion 12, whereby a reaction force is imparted to the vibration in the X direction of the floor portion 10 of the structure which causes the weight 2 to relatively approach the vertical wall portion 12, thereby reducing the vibration in the X direction of the floor portion 10 of the structure. Hence, the active dynamic vibration absorber 1 is adapted to reduce the vibration in the X direction of the floor portion 10 of the structure.

Incidentally, with the active dynamic vibration absorber 1, the moving means 6 includes the wire 54 which is connected at the one end portion 53 to the weight 2 and is wound around the pulley 51; the wire 56 which is connected at the one end portion 55 to the weight 2 and is wound around the pulley 52; and the flexible body pulling means 57 which is provided on the weight 2 and is connected to the other end portions of the wires 54 and 56, such that, in its operation in one direction, the flexible body pulling means 57 pulls the wire 54 and causes the weight 2 to pull the wire 56 due to the pulling of the wire 54, while, in its operation in another direction which is a direction opposite to the one direction, the flexible body pulling means 57 pulls the wire 56 and causes the weight 2 to pull the wire 54 due to the pulling of the wire 56. Therefore, even if the distance in the X direction between the weight 2 and the frame 3, i.e., the clearance X1 in this embodiment, is made large to widen the dynamic range, it is unnecessary to enlarge the acting force in the X direction in correspondence therewith, thereby making it possible to obtain a desired dynamic range with respect to the X direction and attain a reduction in cost.

In addition, with the active dynamic vibration absorber 1, the pulleys 51 and 52 can be operated like movable blocks, with the result that the tractive force for the wires 54 and 56 can be made small, so that in the case where the flexible body pulling means 57 is implemented by the reversible electric motor 71 as in this embodiment, it is possible to use a reversible electric motor 71 with a small torque, thereby making it possible to obtain a desired dynamic range and attain a higher performance and a further cost reduction.

In addition, with the active dynamic vibration absorber 1, since the holding mechanism 4 has the U-shaped leaf springs 21 to 26, the weight 2 and the frame 3 can be held movably in the X direction without frictional resistance, with the result that an active dynamic vibration absorbing function can be obtained in a substantially ideal form.

Figure 6:
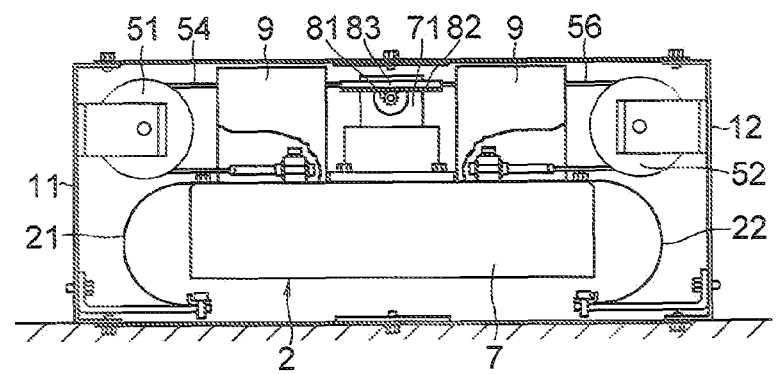
FIG. 6 is a plan view of another preferred embodiment of the present invention.

With the above-described active dynamic vibration absorber 1, the moving means 6 is configured by including the pulley 72, the moving means 6 may be configured as shown in FIG. 6 in substitution thereof or in conjunction therewith. Namely, in the active dynamic vibration absorber 1 shown in FIG. 6, there are provided the reversible electric motor 71 fixed to the weight 2, a pinion 81 which is connected to the output rotating shaft of the reversible electric motor 71 so as to rotate together with that output rotating shaft, and an X-direction traveling body constituted by a rack 83 which is disposed movably in the X direction in such a manner as to mesh at its rack teeth 82 with the pinion 81 and extend in the X direction. The wire 54 is connected at its other end portion to one end portion of the rack 83 such that as the rack 83 is linearly moved in one direction of the X direction by the forward rotation of the pinion 81 due to the operation of the reversible electric motor 71 in the one direction, the wire 54 is pulled by being drawn by the rack 83, whereas as the rack 83 is linearly moved in the other direction of the X direction by the reverse rotation of the pinion 81 due to the operation of the reversible electric motor 71 in the other direction of the X direction, the wire 54 is paid out from the rack 83 to be set in a non-pulling state and to allow the pulling by the weight 2. The wire 56 is connected at its other end portion to the other end portion of the rack 83 such that as the rack 83 is linearly moved in one direction of the X direction by the forward rotation of the pinion 81 due to the operation of the reversible electric motor 71 in the one direction, the wire 56 is paid out from the rack 83 to be set in a non-pulling state and to allow the pulling by the weight 2, whereas as the rack 83 is linearly moved in the other direction of the X direction by the reverse rotation of the pinion 81 due to the operation of the reversible electric motor 71 in the other direction, the wire 56 is pulled by being drawn by the rack 83.

The active dynamic vibration absorber 1 having the pinion 81 and the rack 83 shown in FIG. 6 also operates in the same way as the active dynamic vibration absorber 1 having the pulley 72, and a similar effect can be obtained.

Although, in the active dynamic vibration absorber 1 shown in FIG. 6, the rack 83 is used as the X-direction traveling body, and the rotation of the output rotating shaft of the reversible electric motor 71 is transmitted to the rack 83 by the pinion 81, an arrangement may alternatively be provided such that a ball screw is used as the X-direction traveling body, and a ball nut is mounted on the output rotating shaft of the reversible electric motor 71, so as to transmit the rotation of the output rotating shaft of the reversible electric motor 71 to the ball screw through threaded engagement between the ball nut and the ball screw. Still alternatively, instead of the reversible electric motor 71, a linear motor may be used which has a stator fixed to the weight 2 and a movable element serving as the X-direction traveling body and movable in the X direction with respect to the stator, and the other ends of the wires 54 and 56 may be respectively connected to one end and the other end of the movable element of the linear motor serving as the X-direction traveling body.

The active dynamic vibration absorber 1 thus using the ball nut and the ball screw and the active dynamic vibration absorber 1 using the linear motor having the stator and the movable element also operate in a similar manner to the active dynamic vibration absorber 1 shown in FIG. 1, and allow similar advantages to be obtained.

It should be noted that although each of the above-described active dynamic vibration absorbers 1 is adapted to reduce the vibration of a structure in the X direction, an active dynamic vibration absorber adapted to reduce the vibration of a structure in the Y direction with a similar construction may be juxtaposed with the active dynamic vibration absorber 1 adapted to reduce the vibration of a structure in the X direction so as to reduce the vibration of the structure in the X direction and the Y direction. Still alternatively, an arrangement may be provided such that another frame is provided outside the frame 3, the frame 3 is caused to float from the floor portion 10, and this outer frame is fixed to the floor portion 10, while, by using a holding mechanism similar to the holding mechanism 4, the frame 3 is held by this outer frame movably in the Y direction but immovably in the X direction and the vertical direction V, wherein the relative vibration of a fixed value in the Y direction of the weight 2 with respect to the outer frame is detected by the detecting means 5, and the weight 2 is relatively moved in the X direction with respect to the outer frame by a moving means similar to the moving means 6 on the basis of a detection signal from the detecting means 5, such that the relative movement in the Y direction of the weight 2 with respect to the outer frame is allowed, while the vibrational displacement in the Y direction of the weight 2 with respect to the outer frame is reduced.

DESCRIPTION OF REFERENCE NUMERALS

1: active dynamic vibration absorber
2: weight
3: frame
4: holding mechanism
5: detecting means
6: moving means

The invention claimed is:

1. An active dynamic vibration absorber comprising: a weight; a frame arranged adjacent to said weight; a holding mechanism which is interposed between said weight and said frame and holds said weight movably in one direction in a horizontal plane with respect to said frame, while holding said weight immovably in another direction in the horizontal plane intersecting the one direction and in a vertical direction perpendicular to the horizontal plane; detecting means for detecting the relative vibration of a predetermined value in the one direction of said weight with respect to said frame; and moving means for relatively moving said weight in the one direction with respect to said frame so as to decrease the vibrational displacement in the one direction of said weight with respect to said frame on the basis of a detection signal from the detecting means, wherein said frame has a pair of vertical wall portions which are opposed to each other in the one direction with said weight located therebetween, and said moving means includes a first rotatable body which is rotatably mounted on one of the pair of vertical wall portions; a second rotatable body which is rotatably mounted on another one of the pair of vertical wall portions; a first flexible body which is connected at one end portion to said weight and is wound around the first rotatable body; a second flexible body which is connected at one end portion to said weight and is wound around the second rotatable body; and a flexible body pulling means which is provided on said weight and is connected to other end portions of said first and said second flexible body, such that, in its operation in the one direction, the flexible body pulling means pulls the first flexible body and causes said weight to pull the second flexible body due to the pulling of the first flexible body, while, in its operation in another direction which is a direction opposite to the one direction, the flexible body pulling means pulls the second flexible body and causes said weight to pull the first flexible body due to the pulling of the second flexible body.

2. The active dynamic vibration absorber according to claim 1, wherein said flexible body pulling means includes a reversible electric motor fixed to said weight and a rotating body which is connected to an output rotating shaft of the reversible electric motor so as to rotate together with the output rotating shaft, and wherein the first flexible body is connected at its other end portion to the rotating body such that as the rotating body is rotated in the one direction by the operation of the reversible electric motor in the one direction, the first flexible body is pulled by being taken up onto the rotating body, whereas as the rotating body is rotated in the other direction by the operation of the reversible electric motor in the other direction, the first flexible body is paid out from the rotating body to allow the pulling by said weight, and the second flexible body is connected at its other end portion to the rotating body such that as the rotating body is rotated in the one direction by the operation of the reversible electric motor in the one direction, the second flexible body is paid out from the rotating body to allow the pulling by said weight, whereas as the rotating body is rotated in the other direction by the operation of the reversible electric motor in the other direction, the second flexible body is pulled by being taken up onto the rotating body.

3. The active dynamic vibration absorber according to claim 1, wherein said flexible body pulling means includes a reversible electric motor fixed to said weight, a pinion which is connected to an output rotating shaft of the reversible electric motor so as to rotate together with the output rotating shaft, and a traveling body constituted by a rack which is disposed in such a manner as to mesh with the pinion and extend in the one direction, and wherein the first flexible body is connected at its other end portion to one end portion of the traveling body such that as the traveling body is linearly moved in the one direction by the operation of the reversible electric motor in the one direction, the first flexible body is pulled by being drawn by the traveling body, whereas as the traveling body is linearly moved in the other direction by the operation of the reversible electric motor in the other direction, the first flexible body allows the pulling by said weight, and the second flexible body is connected at its other end portion to another end portion of the traveling body such that as the traveling body is linearly moved in the one direction by the operation of the reversible electric motor in the one direction, the second flexible body allows the pulling by said weight, whereas as the traveling body is linearly moved in the other direction by the operation of the reversible electric motor in the other direction, the second flexible body is pulled by being drawn by the traveling body.

4. The active dynamic vibration absorber according to claim 1, wherein said flexible body pulling means includes a linear motor which has a stator fixed to said weight and a movable element which is movable in the one direction with respect to the stator, and wherein the first flexible body is connected at its other end portion to one end portion of the movable element such that as the movable element is linearly moved in the one direction by the operation of the linear motor in the one direction, the first flexible body is pulled by being drawn by the movable element, whereas as the movable element is linearly moved in the other direction by the operation of the linear motor in the other direction, the first flexible body allows the pulling by said weight, and the second flexible body is connected at its other end portion to another end portion of the movable body such that as the movable element is linearly moved in the one direction by the operation of the linear motor in the one direction, the second flexible body allows the pulling by said weight, whereas as the movable element is linearly moved in the other direction by the operation of the linear motor in the other direction, the second flexible body is pulled by being drawn by the movable element.

5. The active dynamic vibration absorber according to claim 1, wherein said flexible body pulling means includes a reversible electric motor fixed to said weight, a ball nut which is connected to an output rotating shaft of the reversible electric motor so as to rotate together with the output rotating shaft, and a traveling body constituted by a ball screw which is disposed in such a manner as to screw with the ball nut and extend in the one direction, and wherein the first flexible body is connected at its other end portion to one end portion of the traveling body such that as the traveling body is linearly moved in the one direction by the operation of the reversible electric motor in the one direction, the first flexible body is pulled by being drawn by the traveling body, whereas as the traveling body is linearly moved in the other direction by the operation of the reversible electric motor in the other direction, the first flexible body allows the pulling by said weight, and the second flexible body is connected at its other end portion to another end portion of the traveling body such that as the traveling body is linearly moved in the one direction by the operation of the reversible electric motor in the one direction, the second flexible body allows the pulling by said weight, whereas as the traveling body is linearly moved in the other direction by the operation of the reversible electric motor in the other direction, the second flexible body is pulled by being drawn by the traveling body.

6. The active dynamic vibration absorber according to claim 1, wherein said frame has another pair of vertical wall portions which are opposed to each other in the other direction with said weight located therebetween, and said holding mechanism includes a pair of vertically mounted U-shaped leaf springs which are each interposed between said weight and each of the other pair of vertical wall portions so as to allow the movement of said weight in the one direction with respect to said frame and to hold said weight immovably in the vertical direction with respect to said frame, and a pair of horizontally mounted U-shaped leaf springs which are each interposed between each of the pair of vertical wall portions and said weight so as to allow the movement of said weight in the one direction with respect to said frame and to prevent the movement of said weight in the other direction with respect to said frame.

7. The active dynamic vibration absorber according to claim 1, wherein each of the first and the second flexible body is a cord-like body including such as a wire, a belt, and a chain.

8. The active dynamic vibration absorber according to claim 1, wherein the reversible electric motor or the linear motor is adapted to allow the free rotation of the output rotating shaft or the linear movement of the movable element and to pull the first or the second flexible body through the output rotating shaft or the movable element on the basis of a detection signal of said detecting means, so as to relatively move said weight in the one direction with respect to the pair of vertical wall portions of said frame.

9. The active dynamic vibration absorber according to claim 1, wherein said detecting means is adapted to detect the relative vibration of a predetermined value in the one direction of said weight with respect to said frame.

10. The active dynamic vibration absorber according to claim 1, wherein said detecting means is adapted to detect at least one of the acceleration, velocity, and displacement of the relative vibration.

11. The active dynamic vibration absorber according to claim 1, wherein said detecting means is adapted to detect the relative vibration of a fixed value or higher in the one direction of said weight with respect to said frame.

12. A structure equipped with the active dynamic vibration absorber according to claim 1, wherein said frame of the active dynamic vibration absorber is fixed to a floor portion such as a roof floor of the structure.

13. The structure according to 12, wherein said detecting means is adapted to detect the relative vibration of said weight with respect to the structure.

* * * * *